(12) United States Patent
Klimpel et al.

(10) Patent No.: US 8,272,930 B2
(45) Date of Patent: Sep. 25, 2012

(54) AIR SYSTEM

(75) Inventors: Frank Klimpel, Kayhude (DE); Torge Pfafferott, Hamburg (DE)

(73) Assignee: Airbus Operations GmbH (DE)

( * ) Notice: Subject to any disclaimer, the term of this patent is extended or adjusted under 35 U.S.C. 154(b) by 291 days.

(21) Appl. No.: 11/795,778

(22) PCT Filed: Jan. 24, 2006

(86) PCT No.: PCT/EP2006/000609
§ 371 (c)(1),
(2), (4) Date: Jul. 20, 2007

(87) PCT Pub. No.: WO2006/079507
PCT Pub. Date: Aug. 3, 2006

(65) Prior Publication Data
US 2009/0291625 A1    Nov. 26, 2009

Related U.S. Application Data

(60) Provisional application No. 60/647,108, filed on Jan. 26, 2005.

(30) Foreign Application Priority Data

Jan. 26, 2005 (DE) .......................... 10 2005 003 645

(51) Int. Cl.
*B64D 11/00* (2006.01)
*B64D 13/02* (2006.01)

(52) U.S. Cl. ........................................................ 454/71
(58) Field of Classification Search ...................... 454/71
See application file for complete search history.

(56) References Cited

U.S. PATENT DOCUMENTS

| | | | |
|---|---|---|---|
| 2,923,222 A | | 2/1960 | Manning et al. |
| 6,306,032 B1 * | | 10/2001 | Scheffler et al. ................ 454/71 |
| 2001/0025506 A1 | | 10/2001 | Buchholz et al. |
| 2001/0032472 A1 | | 10/2001 | Buchholz et al. |
| 2002/0152765 A1 | | 10/2002 | Sauterleute et al. |
| 2004/0060317 A1 | | 4/2004 | Lents et al. |
| 2004/0155147 A1 | | 8/2004 | Munoz et al. |

FOREIGN PATENT DOCUMENTS

| | | |
|---|---|---|
| DE | 100 11 238 A1 | 9/2001 |
| FR | 2 485 473 A1 | 12/1981 |
| JP | 05322216 A | 12/1993 |
| JP | 2000065432 A | 3/2000 |
| JP | 2001213398 A | 8/2001 |
| SU | 1269415 A1 | 11/1986 |
| WO | WO-2004/108174 A1 | 12/2004 |

* cited by examiner

*Primary Examiner* — Steven B McAllister
*Assistant Examiner* — Samantha Miller
(74) *Attorney, Agent, or Firm* — Lerner, David, Littenberg, Krumholz & Mentlik, LLP

(57) ABSTRACT

An air system for pressurizing and air conditioning a cockpit and cabin space of a plane comprises a compressor (3) for compressing an air mass flow, wherein the air mass flow to be compressed is extracted through a ram air duct (13, 14) from the environment of the plane and supplied through a heat exchanger (15, 18) to at least one zone (10A-D) to be pressurized and air conditioned.

12 Claims, 3 Drawing Sheets

AIR SYSTEM

This application claims the benefit of the filing date of U.S. Provisional Patent Application No. 60/647,108 filed Jan. 26, 2005, and of German Patent Application No. 10 2005 003 645.7 filed Jan. 26, 2005, the disclosure of which is hereby incorporated herein by reference.

This invention relates to an air system, in particular a bleed air free air system for pressurizing and air conditioning a cockpit and cabin space of planes with integrated zone temperature control.

Known air systems and/or air conditioning systems for planes with jet engines and pressurized cabin utilizing pneumatic energy of the jet engine compressors in the form of a compressed mass flow, which drives the air conditioning system and which is at the same time conditioned by the air conditioning system and supplied to the cabin as fresh air.

For operating a conventional air conditioning system, the jet engine compressor continuously draws from the jet engine compressor an air mass flow via appropriate tapping points. Depending on the load condition of the power plant, the tapping condition of bleed air varies, so that temperatures between about 250° C. to 450° C. and pressures of about 1.8 bar to 5 bar are possible. The condition of the derived mass flow cannot be influenced directly.

Basically, it is an object of the air conditioning system to cool down and release the bled, compressed, hot air in order to reach a comfortable cabin temperature. This cooling is usually done by a heat exchanger. This energy discharge is irreversible, and therefore not further usable, as it is discharged into the environment. In order to obtain an adequate fresh air volume flow in the cabin, an upstream valve has to be used to reduce pressure by throttling, which also dissipates energy irreversibly.

If cooling by the heat exchanger is insufficient, pressure of the mass flow has to be increased by an internal compressor stage of the air conditioning system, and tension released to cabin pressure after temperature reduction through heat transfer to the environment in the subsequent cooling turbine. The temperature lowering accompanying the tension release leads to an output temperature that is lower than the cabin temperature and thus has a cooling effect.

In the state of the art, the output temperature from the air conditioning system is obtained by mixing the cooled air mass flow with a hot air mass flow, which is derived before the air conditioning system. Temperature control in the plane cabin is usually done according to a zone concept, wherein the cabin is divided into different temperature zones. The respective requested zone temperature is reached by injecting an air mass flow with an appropriate higher or lower temperature in relation to the current zone temperature. These injection temperatures are reached by admixing hot air. This concept means that the temperature of the mixed air in the mixer must meet the lowest temperature demand of all zones. Thus, the output temperature from the cooling unit also has to be controlled so that the mixer temperature meets the lowest temperature demand of all zones.

One substantial disadvantage of the present technique described above is that the energy required for pressurizing and air conditioning in the form of pneumatic energy is provided by the jet engine compressor, and this tapping of pneumatic energy cannot be controlled efficiently as far as energetics are concerned. A large proportion of the tapped energy is dissipated by heat transfer and throttling operations and thus is not further usable. Another disadvantage is that the tapping condition primarily depends on the load condition of the power plant, which is mainly determined by thrust. In addition, tapping a mass flow from the core flow of the power plant has a negative effect on power plant performance.

It is an object of the invention to create an air system for pressurizing and air conditioning a cockpit and cabin space of a plane, wherein it is not necessary to continuously draw an air mass flow from the engine compressor in order to pressurize and air condition the cockpit or the plane cabin, whereby the above mentioned disadvantages do not occur.

The solution of the object defined is apparent from patent claim 1. Developments of the invention are indicated in the subclaims.

According to the invention, an air system for pressurizing and air conditioning a cockpit and cabin space of a plane is provided, comprising a compressor for compressing an air mass flow, wherein the air mass flow to be compressed being tapped from the environment of the plane through a ram air duct and supplied by a heat exchanger to at least one zone to be pressurized and conditioned in the plane cabin.

The basic idea of the invention is to provide the required air mass flow by a compressor that compresses the air to cabin pressure plus the additional pressure losses due to cross-flow (Durchströmung) and distribution. The air mass flow to be compressed is tapped from the environment through a ram air duct.

According to the invention, it is possible to provide the energy to be produced for thermal conditioning of the required fresh air mass flow as required in the form of electrical energy and as a ram air mass flow from the environment (environment as heat sink). Losses are thus reduced, allowing for the engines to be optimized as no bleed air is tapped. On the whole, it is thus possible to reduce fuel demand. Furthermore, advantages in maintenance are obtained as the bleed air system according to the state of the art is completely omitted, and the air system according to the invention can be mounted as a compact system.

Hereunder, a preferred example embodiment of the invention is described with reference to the appended drawings.

In the figures, same components are labeled with the same reference numbers.

Figure 1:
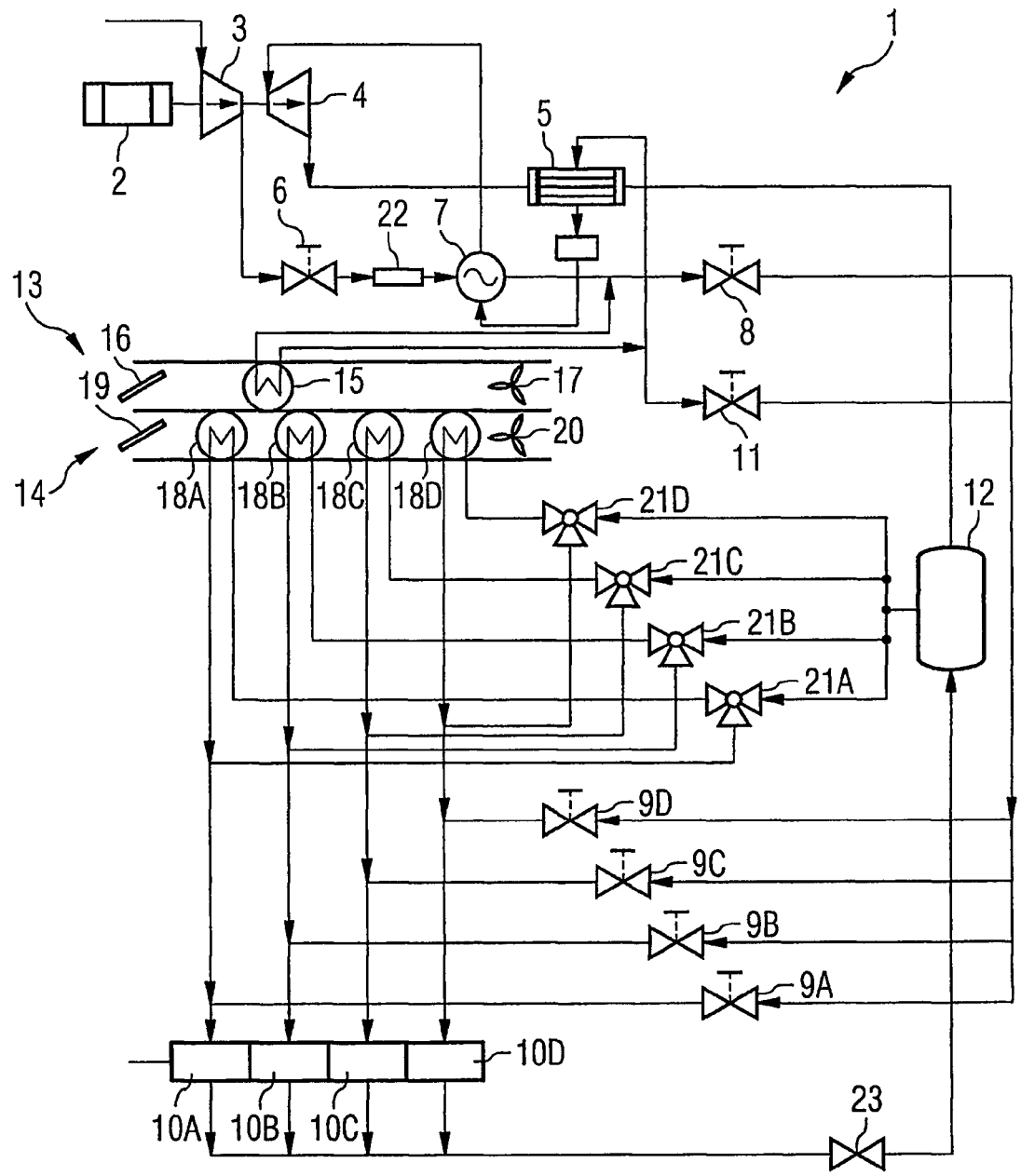
FIG. 1 shows a schematic view of an air system according to a preferred example embodiment of the invention.

FIG. 1 shows a schematic view of an air system 1 according to the preferred example embodiment of the invention. The air system 1 comprises an electric motor 2 for driving a compressor 3. The compressor 3 compresses air from the environment to cabin pressure plus the additional pressure losses due to cross-flow and distribution. The required air volume flow results from the maximum demand which is dependent on the cabin layout. E.g. if greater cooling power and/or heating power is required, the motor 2 can provide greater power and increase air pressure and/or air temperature.

The air system 1 in FIG. 1 fther comprises a turbine 4 through which the compressed air is supplied to a condenser 5. The function of turbine 4 will be described later with reference to FIG. 3.

The air system 1 further comprises a volume flow control 6 for controlling the compressed air mass flow delivered by the compressor 3 to a desired value which is primarily dependent on the cabin layout. The volume flow control valve 6, which is provided after the compressor 3, is for controlling the volume flow in the cabin (zones 10A-D). Alternatively, this valve can be omitted, and the compressor 3 can be used with adjustable geometry.

As shown in FIG. 1, between the condenser 5 and the turbine 4, an intermediate heat exchanger 7 is arranged. An air mass flow from the heat exchanger 7 flows e.g. via a pressure control valve 8 and zone temperature control valves 9 into various zones 10A-D in a plane cabin. Via the temperature control valves 9A-9D, appropriate precise control of temperatures for each zone 10A-10D can be obtained independently.

As shown in FIG. 1, the air system 1 according to the preferred example embodiment further comprises a main temperature control valve 11 that is arranged between the condenser 5 and an air mixer 12 in order to control the air mass flow flowing into the air mixer 12 for a predefined temperature.

FIG. 1 further shows a ram air duct 13, wherein a main heat exchanger 15 is located, which delivers e.g. an air mass flow via the main temperature control valve 11 to the air mixer 12. In the ram air duct 13, there are further located an controllable ram air flap 16 and an electrically driven ram air ventilator 17 for operating the main heat exchanger 15.

According to the preferred example embodiment, e.g. in parallel to the ram air duct 13, a second ram air duct 14 is arranged, wherein, according to the preferred example embodiment, four zone heat exchangers 18A-18D are located, which are assigned to the corresponding zones 10A-D. Similarly to ram air duct 13, the ram air duct 14 comprises a controllable ram air flap 19 and an electrically driven ram air ventilator 20.

In order to control the temperature in the zones 10A-D independently from each other, the air system 1 comprises zone temperature control valves 21A-D, which are arranged downstream of air mixer 12.

The air system according to the invention further comprises an ozone converter 22, which is arranged downstream of the volume flow control valve 6 and upstream of the intermediate heat exchanger 7.

A return air ventilator 23 of the air system 1, which is arranged upstream of the air mixer 12, delivers air from zones 10A-D to air mixer 12.

Herein below, with reference to FIGS. 2 and 3, various operating scenarios will be described.

Figure 2:
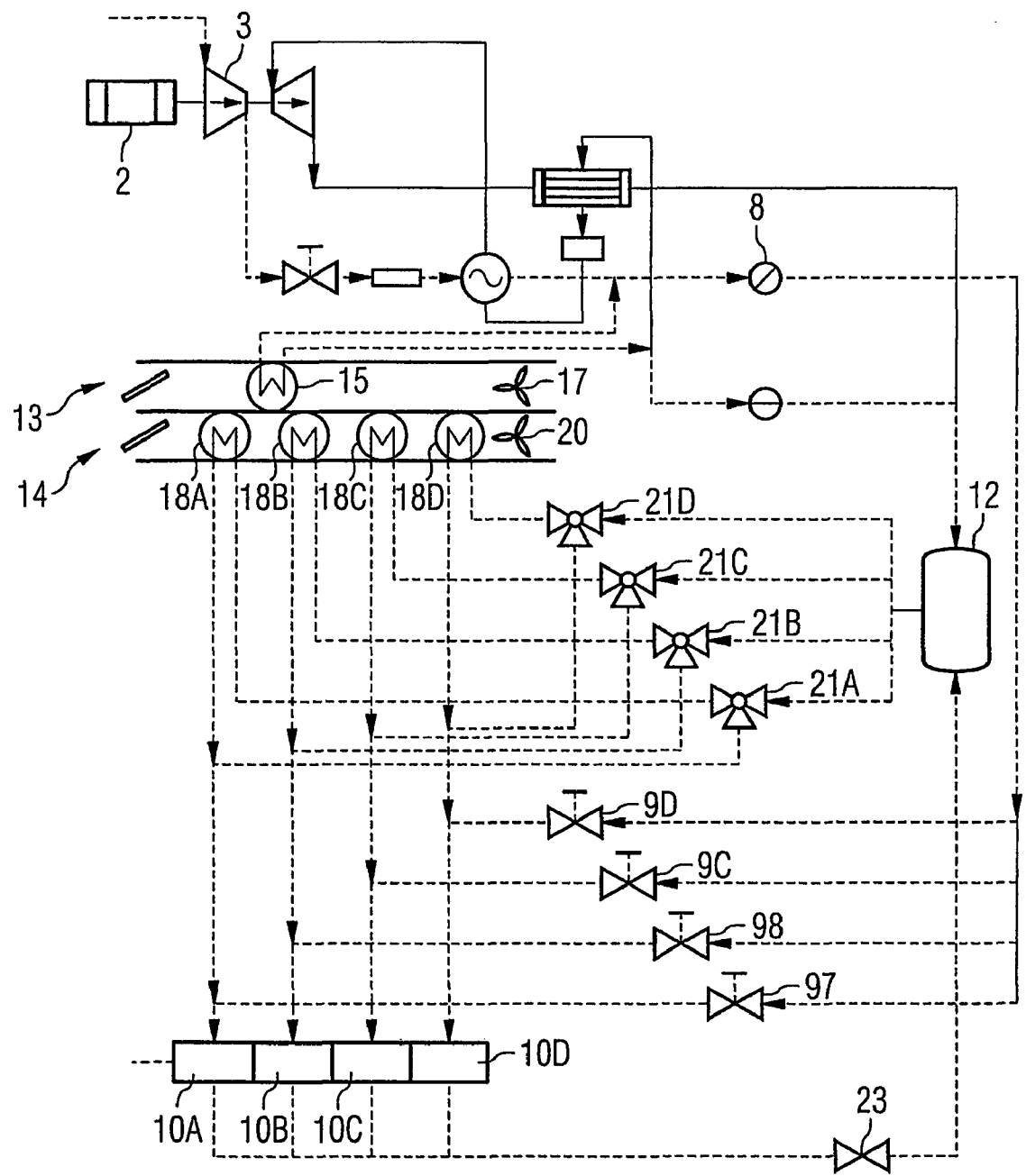
FIG. 2 shows a schematic view of the air system according to FIG. 1 with a flow chart for a heating scenario.

FIG. 2 shows a flow chart (bold dashed lines) for an operating scenario, wherein the cockpit and the cabin space are heated (also called heating scenario).

When the plane is on the ground, the compressor 3 is controlled for a sufficient volume flow. Pressure build-up and/or temperature increase is rated in such a way that the highest temperature demand of all zones 10A-10D is obtained and flow losses are compensated. This pressure build-up is economical as-no surplus pressure energy is produced, and only low thermal energy is created, which may have to be discharged to the environment by heat exchangers.

The excessive temperature of the additional air, which results from compression by the compressor 3, is reduced through the ram air duct 13 at the main heat exchanger 15. After mixing in the air mixer 12 with supplied air from the cabin through the return air ventilator 23, the mixed air is supplied through the zone temperature control valves 21A-21D to the zone heat exchangers 18A-D. By guiding the flow in the zone heat exchangers 18A-D, the zone temperature control valves 21A-D control each individual zone temperature (in the example four separate flows for the four zones 10A-D). Inside the zone heat exchangers 18A-D, the additional air to the individual zones is cooled by outside air in the ram air duct 14 to the requested injection temperature. This control is done by the electrically driven ram air ventilator 20 and the controllable ram air flap 19 as well as by the zone temperature control valves 21A-D. In FIG. 2, the pressure control valve 8 is closed in this case. If a zone 10A-D requires further thermal energy, this is still possible by feeding hot air through pressure control valve 8 and temperature control valves 9A-D.

Herein below, with reference to FIG. 3, a second scenario will be described, wherein the plane is on the ground, and the cabin space has to be cooled down (also called cooling scenario). The corresponding flow chart is shown with bold dashed lines in FIG. 3.

In this cooling scenario, the compressor 3 is controlled for a sufficient volume flow. Pressure build-up and/or temperature increase must be rated at least in such a way that the lowest temperature demand of all zones 10A-D can be obtained and flow losses are covered. This pressure build-up is economical as only low surplus thermal energy is created, which has to be dissipated by heat exchangers.

In as far as possible, cooling-is provided primarily-by the heat exchangers 15, 18A-18D. The main heat exchanger 15 controls in this case for the lowest requested zone temperature, provided this is possible based on the available ambient temperature. After mixing with recirculated air from the cabin through the return air ventilator 23, the air mixed inside the air mixer 12 is supplied to zone heat changers 18A-D through the zone temperature control valves 21A-D. The zone heat exchangers 18A-D allow for further cooling of the zones through the zone temperature control valves 21A-21D. Zones requiring a higher injection temperature are heated with hot air.

Figure 3:
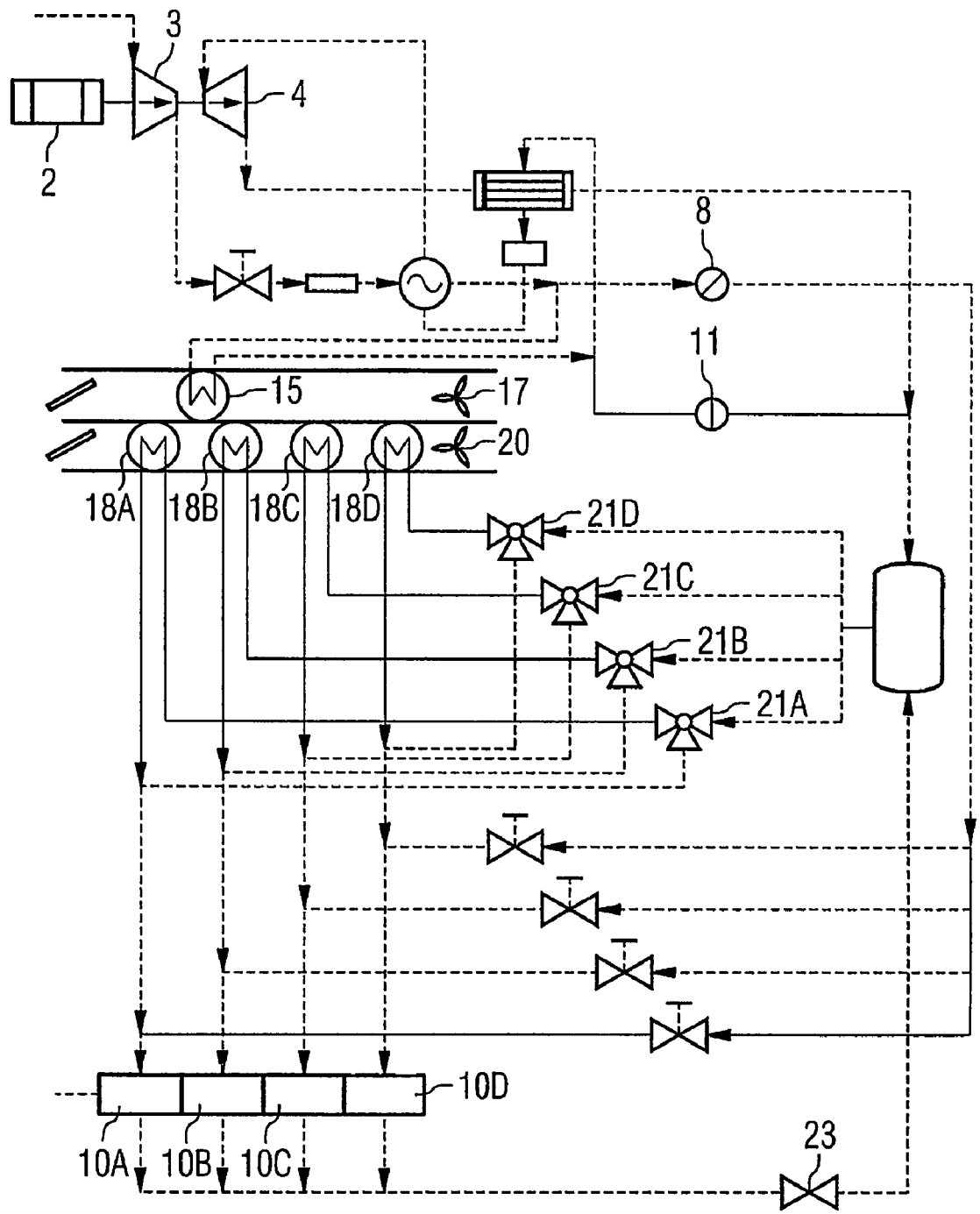
FIG. 3 shows a schematic view of the air system according to FIG. 1 with a flow chart for the cooling scenario.

If the lowest zone temperature cannot be reached only by the ram air heat exchangers, a fractional cross-flow through turbine 4 is produced by closing the main temperature control valve 11, as shown in FIG. 3. In this case, compressor 3 controls for a higher compression final pressure by means of motor 2, so that after main heat exchanger 15 and tension release in turbine 4, sufficient cooling power is obtained.

In this case, zone heat exchangers 18A-D continue to be active as long as further cooling of the mixed air through the zone temperature control valves 21A-D is possible. Due to the mechanical work at tension release, the cross-flown turbine 4 relieves motor 2 and thus recovers energy.

Herein below, further operating scenarios are described, which are to explain the operating mode of the air system 1.

When the plane is in the air and the cabin space has to be heated, compressor 3 is controlled for a sufficient volume flow and a cabin pressure demand. Pressure build-up and/or temperature increase must be rated in such a way that firstly the demand for cabin pressure, and if possible the highest temperature demand of a zone is reached, and flow losses are absorbed. After main heat exchanger 15, similarly to the heating scenario on the ground described above, the temperature is controlled for the highest temperature demand of a zone.

Precise control is done as in FIG. 2 through the zone temperature control valves 21A-D and/or zone heat exchangers 18A-D. If a zone requires further thermal energy, this is still possible by feeding hot air through the pressure control valve 8 and temperature control valves 9A-D.

For the case that the plan is in the air and cooling of the cabin space must be performed, the compressor is controlled for a sufficient volume flow and for a cabin pressure demand. Pressure build-up and/or temperature increase must be rated in such a way that firstly the demand for cabin pressure, and if possible the lowest temperature demand of a zone is reached, and flow losses are absorbed.

According to the ISA standard, cooling will mostly be possible readily by aid of the main heat exchanger 15 and zone heat exchangers 18A-D by utilizing the refrigerating potential of ram air. Ambient temperatures fall e.g. from −4° C. at 10000 feet to −56° C. at 39000 feet according to the ISA standard. This type of control is very economical for the operating behavior as only small losses occur. If sufficient cooling is not possible, the turbine 4 is driven via the main temperature control valve 11 with a simultaneous pressure increase by compressor 3, and the air is released to cabin pressure level until sufficient cooling is obtained. The zone heat exchangers 18A-D continue to be active also in this case as long as further cooling of the mixed air is possible through the zone temperature control valves 21A-21D.

Although the invention has been described above with reference to a preferred example embodiment, it is obvious that modifications and alterations can be made without going beyond the scope of protection of the invention.

E.g. more than four zones and/or zone heat exchangers can be provided, wherein the dimension of the zone heat exchangers can be designed for the flight scenario according to the ISA standard. Operating scenarios wherein the system is active can be related to the flight. Due to very cold ambient temperatures of −56° C. at a flight altitude of 40000 feet, sufficient heat transfer is possible even over relatively small heat exchange surfaces. Therefore, if possible, the design should be made for ISA +23 (HOT), corresponding to −33° C. at 40000 feet, in order to meet even increased cooling power demands.

The system described with reference to the preferred example embodiment can further be completed in another step with the integration of an additional heat exchanger in the circulating air mass flow. This heat exchanger can be arranged either before or after the circulating air ventilator. Via this heat exchanger, heat is extracted from the circulating air, leading to temperature lowering. This heat exchanger is for instance embodied as an evaporator, which is part of a cold vapor compression refrigerating machine, and which can be arranged inside the pressure hull of the plane. Due to this integration, the input temperature of the circulating air in the mixer is decreased. Thereby, the temperature of the fresh air mass flow in the mixer can be increased so as to reach the same mix temperature as when the described heat exchanger in the circulating air mass flow is omitted. Thus, the electrical power demand for the compressor and/or the ram air mass flow can be reduced. At the same time, electrical energy for driving the cold vapor compression refrigerating machine has to be provided, wherein the efficiency of a compression refrigerating machine is usually higher than the efficiency of an open cold air refrigerating process. This means that the electrical energy to be produced for providing the same refrigerating power is less for the compression refrigerating machine.

Furthermore, e.g. the system described with reference to the preferred example embodiment can be completed with an additional heat exchanger in the circulating air mass flow, which is part of a central on-board cooling system. This arrangement uses a cooling system already integrated in the plane, whereby advantages regarding energy demand, and the entire system weight can be obtained, as it is not necessary to assume absolute simultaneity of the cooling power demand. Cooling power demand for cooling food and beverages will increasingly subside during cruise, so that surplus cooling power can be used for the air conditioning system.

Additionally, it has to be noted that "comprising" does not exclude other elements or steps and "a" or "one" does not exclude a plurality. Furthermore, it should be noted that characteristics or steps that have been described with reference to one of the above example embodiments can also be used in combination with other characteristics or steps of other example embodiments described above. Reference signs in the claims are not to be construed as a limitation.

Reference List
1 air system
2 electric motor
3 compressor
4 turbine
5 condenser
6 volume flow control
7 intermediate heat exchanger
8 pressure control valve
9 temperature control valves
10 zones
11 main temperature control valve
12 air mixer
13 ram air duct
14 ram air duct
15 main heat exchanger
16 controllable ram air flap
17 electrical ventilator
18A-D zone heat exchangers
19 controllable ram air flap
20 electrical ventilator
21A-D zone temperature control valves
22 ozone converter
23 return air ventilator

The invention claimed is:

1. An air system for pressurizing and air conditioning a cockpit and cabin space of a plane, comprising:
   a compressor for compressing an air mass flow,
   a main heat exchanger arranged in a first ram air duct;
   at least first and second zone heat exchangers arranged in a second air duct;
   wherein the air mass flow to be compressed is extracted through the first ram air duct from the environment of the plane and supplied through the main heat exchanger to at least one zone of the plane to be pressurized and air conditioned;
   wherein at least first and second zones of the at least one zone with different temperature demands are assigned to first and second zone heat exchangers, respectively, in order to output additional air at the same or separate temperatures, corresponding to the temperature demands, into the respective first and second zones; and
   wherein the first and second zone heat exchangers are located in the second ram air duct for cooling the additional air to the first and second zones through outside air to requested injection temperatures for the first and second zones.

2. An air system according to claim 1, wherein the first ram air duct comprises a first controllable ram air flap and a first electrically driven ram air ventilator, and wherein the second ram air duct comprises a second controllable ram air flap and a second electrically driven ram air ventilator.

3. An air system according to claim 1, further comprising at least first and second zone temperature control valves, wherein the compressed air mass flow is delivered by an air mixer and the first and second zone temperature control valves to the first and second zone heat exchangers, respectively.

4. An air system according to claim 3, wherein the air mixer mixes the compressed air mass flow with a return air mass flow from the first and second zones.

5. An air system according to claim 3, wherein the air mixer, in a heating scenario, is controlled for the highest temperature demand of all the zones.

6. An air system for pressurizing and air conditioning a cockpit and cabin space of a plane, comprising:
   a compressor for compressing an air mass flow,
   a main heat exchanger arranged in a first ram air duct;
   at least first and second zone heat exchangers;
   wherein the air mass flow to be compressed is extracted through the first ram air duct from the environment of the plane and supplied through the main heat exchanger to at least one zone of the plane to be pressurized and air conditioned, and
   wherein at least first and second zones of the at least one zone with different temperature demands are assigned to the first and second zone heat exchangers, respectively, in order to output additional air at the same or separate temperatures, corresponding to the temperature demands, into the respective first and second zones.

7. An air system according to claim 6, wherein the first ram air duct comprises a first controllable ram air flap and a first electrically driven ram air ventilator.

8. An air system according to claim 6, wherein the at least first and second zone heat exchangers are located in a second ram air duct for cooling the additional air to the at least first and second zones through outside air to requested injection temperatures for the first and second zones.

9. An air system according to claim 8, wherein the second ram air duct comprises a second controllable ram air flap and a second electrically driven ram air ventilator.

10. An air system according to claim 6, further comprising at least and second zone temperature control valves, wherein the compressed air mass flow is delivered by an air mixer and the at least first and second zone temperature control valves to the at least first and second zone heat exchangers, respectively.

11. An air system according to claim 10, wherein the air mixer mixes the compressed air mass flow with a return air mass flow from the at least first and second zones.

12. An air system according to claim 10, wherein the air mixer, in a heating scenario, is controlled for the highest temperature demand of all the zones.

* * * * *